United States Patent [19]
Engalitcheff, Jr.

[11] 3,794,306
[45] Feb. 26, 1974

[54] INJECTOR TYPE COOLING TOWER

[75] Inventor: John Engalitcheff, Jr., Gibson Island, Md.

[73] Assignee: Baltimore Aircoil Company, Inc., Baltimore, Md.

[22] Filed: May 21, 1969

[21] Appl. No.: 826,638

Related U.S. Application Data

[63] Continuation-in-part of Ser. No. 795,516, Jan. 31, 1969, abandoned.

[52] U.S. Cl.... 261/116, 261/DIG. 11, 261/DIG. 54, 55/257
[51] Int. Cl.............................................. B01f 3/04
[58] Field of Search...... 261/DIG. 54, 116, DIG. 11; 55/257, 440

[56] References Cited
UNITED STATES PATENTS

| 2,732,190 | 1/1956 | Mart | 261/DIG. 11 |
|---|---|---|---|
| 1,255,518 | 2/1918 | Ehrhart | 261/DIG. 54 |
| 2,032,404 | 3/1936 | Fisher | 261/DIG. 54 |
| 2,337,983 | 12/1943 | Fisher | 261/DIG. 54 |
| 3,386,712 | 6/1968 | Pafla | 261/DIG. 54 |
| 3,498,590 | 3/1970 | Furlong | 261/DIG. 11 |

OTHER PUBLICATIONS

Koch Engineering Co., Inc. catalog, published 1959, Titled "Koch Jet Forced Draft Cooling Tower".

Primary Examiner—Tim R. Miles
Assistant Examiner—Steven H. Markowitz
Attorney, Agent, or Firm—Michael C. Sudal, Jr.

[57] ABSTRACT

A cooling tower operating on the injection or aspiration principle in which the air is pumped by an injector designed to produce a large air-water interface and a large air-water relative movement for good heat exchange. A common exhaust stack serves a plurality of injectors to provide a construction of large capacity with savings in height requirements and avoidance of recirculation problems.

4 Claims, 16 Drawing Figures

INVENTOR
JOHN ENGALITCHEFF, JR.

BY
Stevens, Davis, Miller & Mosher
ATTORNEYS

INJECTOR TYPE COOLING TOWER

This application is a continuation in part of my prior application, Ser. No. 795,516, filed Jan. 31, 1969 and now abandoned.

This invention relates to evaporative heat exchangers and more particularly to cooling towers of the type which are used for cooling water for air conditioning, and various other industrial purposes.

Cooling towers are widely used today in various industrial applications where it is necessary to extract heat from water. In general, the principle of an evaporative cooling tower is that water is so distributed as to present a large interface to a current of air. A small portion of the water so distributed is evaporated, the heat of vaporization necessary for that evaporation being extracted from the remaining water. This cooled water is collected and circulated to a point of use and usually recirculated back to the tower. In other instances, such as when a tower is used to prevent thermal polution, the cooled water is discharged.

In order to create a large water surface area the conventional cooling tower involves a quantity of fill or wet deck material over which water is flowed. As the water flows over the fill or wet deck, fans or blowers supply flowing air contacting the water surface which brings about the evaporation. This fill or wet deck material is expensive and can be subject to fouling and deterioration. With the increasing problems of natural water supplies dwindling, evaporative coolers which can recirculate and so conserve water are coming into great demand; and the market for cooling towers is at the present time a very large one.

Conventional cooling towers have heretofore involved certain critical moving parts such as an air moving device, normally a conventional fan for pumping air to contact the large water surface. In addition, conventional equipment also requires a separate water pump for circulation of water to the tower distribution system. These pumps and fans are run by separate motors and they have separate and different horsepower requirements. Generally they are located in separate equipment areas thereby requiring extensive electrical wiring and controls. Furthermore, most cooling towers use a plurality of fans requiring several motors. The fans have to be protected against undue exposure to moisture and a certain amount of maintenance, such as bearing lubrication and repair, is necessary.

It is an object of this invention cooling tower and to provide an efficient cooling tower with no moving parts and in which air movement through the tower is achieved solely by the injection of water.

According to my invention high velocity, atomized water is injected through an opening causing an entrainment of air and so becomes the prime mover for the air of the cooling tower system. It has been found, as a part of my invention, that when atomized water is injected through a constricted area, thereby inducing an air flow, the velocity of the water relative to the air is high, and the mixing between the two fluids is excellent. This results in a high heat transfer between the air and water.

The heat dissipation capacity of an injector type cooling tower is, of course, related to the injector throat cross-section and since other proportions must be maintained, a single injector of large capacity is necessarily high. As a part of this invention, it has been discovered that one may use a number of relatively small injectors served by a common centrally-located exhaust stack. By this arrangement one is able to get the cooling capacity of a single injector having a throat cross section equal to the sum of the cross sections of the smaller injectors with a substantial saving in overall height of the apparatus and with very excellent and automatic avoidance of air recirculation problems.

In the use of injectors for cooling water, the air-water interface is, of course, important. In dealing with large quantities of water, in order to obtain a fine spray from a single nozzle, that nozzle must have many small orifices. Thus, in such a situation there is always the problem of clogging due to impurities in the water supply. By using a cluster of nozzles each having a single or very few orifices each large enough to avoid the clogging problem but so arranged that the sprays issuing therefrom intersect and impinge upon each other, one is able to deliver equal amounts of water while retaining the large air-water interface and cooling effect characteristics of a fine spray nozzle and yet avoid the clogging problem.

Another object of my invention is to provide a cooling tower having a total power requirement which is less than or does not exceed that of the most efficient units presently available.

Another object of my invention is to provide a cooling tower which has a noise level substantially lower than most units of comparable size.

It is a further object of the present invention to provide a cooling tower which is economical to build, very inexpensive to operate, lightweight, simple to maintain, and capable of being built in very large sizes able to deal with volumes of water in the range of 150,000 gpm or more.

Other objectives and advantages of this invention will be apparent upon consideration of the following detailed description of several embodiments thereof in conjunction with the annexed drawings wherein FIGS. 1 to 5, inclusive, are taken from S.N. 795,516 filed Jan. 31, 1969, and the remaining figures are first presented in this application.

Figure 1:
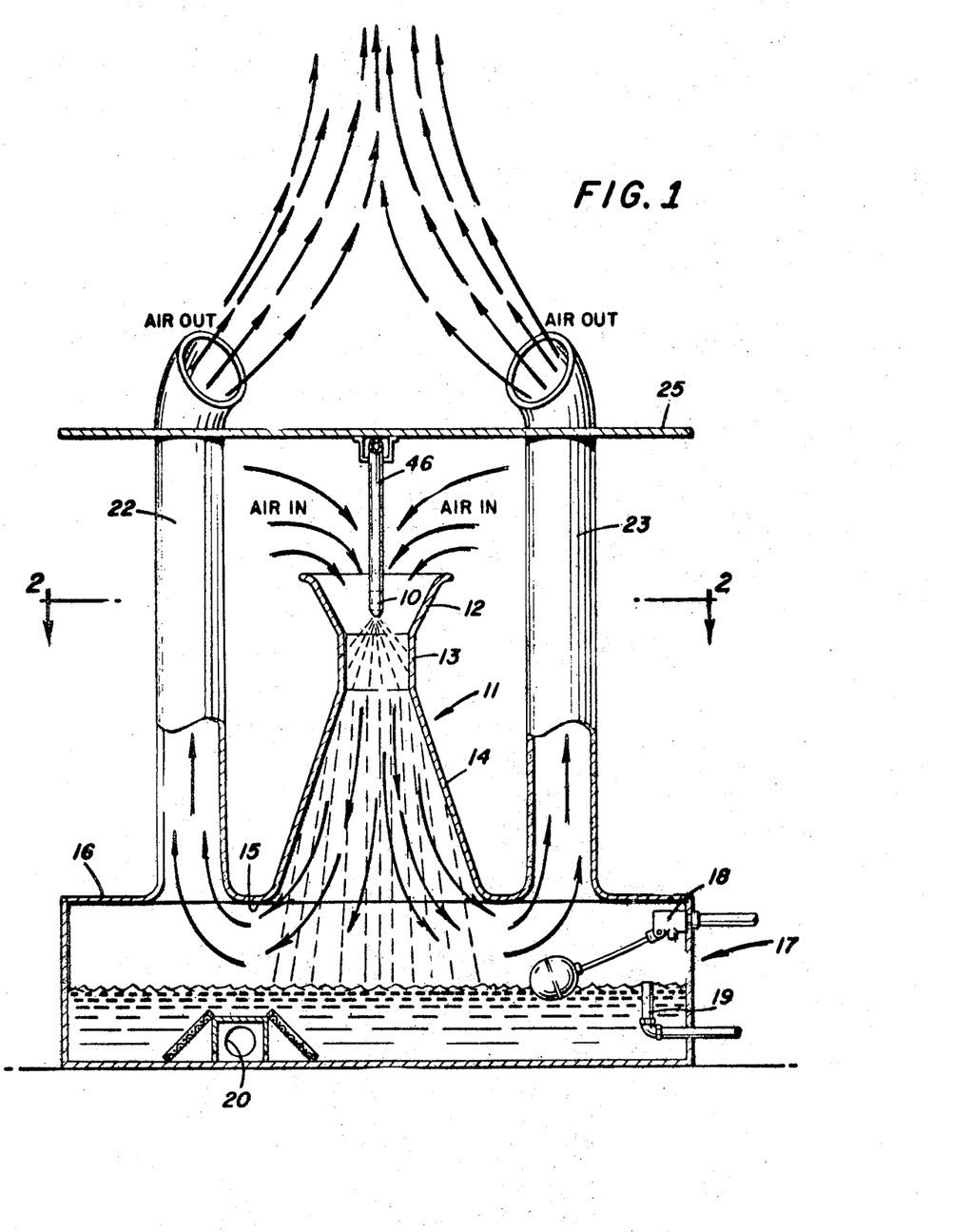
FIG. 1 is a fragmentary view in vertical section of a cooling tower constructed in accordance with the principles of the present invention.
Figure 2:
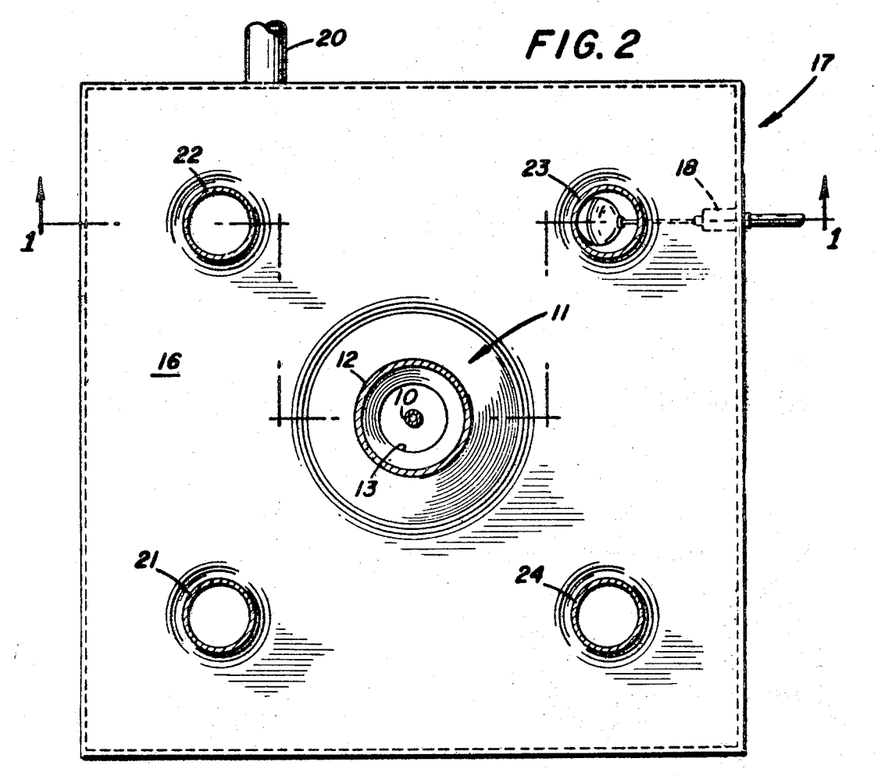
FIG. 2 is a view in horizontal section taken on the line 2—2 of FIG. 1.

Referring now in greater detail to FIGS. 1 and 2, the cooling tower there shown is comprised of a water atomizing nozzle 10 and a venturi 11. The venturi 11 is vertically arranged and is comprised of an upper bell mouth inlet portion 12, an intermediate straight portion 13 constituting the narrow throat of the venturi and a diverging lower portion 14 terminating in an outlet 15 of cross section considerably greater than that of the throat 13.

The water atomizing nozzle 10 is located above the top of the throat 13 and is so designed as to cause the water to spread in atomized form in a conical region the base of which is within the throat 13. The length of the throat 13 and the shape of the spray produce a prolonged high velocity contact between air sucked into the bell mouth inlet 12 of the venturi and water issuing from nozzle 10. The length to diameter ratio and the shape of the intermediate portion 13 are important. The object is to optimize mixing and relative movement of water to air as well as obtain the maximum air quantity to achieve maximum heat transfer.

The diverging lower portion 14 of the venturi 11 is a region of energy conversion from kinetic to static. Although the intermediate portion 13 is the region of high heat transfer, additional transfer is also achieved in diverging lower portion 14. The exit end 15 of expanded section 14 of the venturi 11 is attached to and supported from a deck 16 which is part of an enclosed pan section 17. The pan section 17 provides a cooled water sump and a moisture separating chamber. As can be seen from FIG. 2, pan section 17 is square in cross-section. It has the usual cooling tower accessories such as a water make-up connection 18, a water overflow drain 19, and a suction-strainer combination 20 through which cooled water is withdrawn to a point of use.

Four vertical ducts 21, 22, 23, and 24 extend upwardly from deck 16 to a level considerably above the level of the bell mouth 12 of the venturi 11. A baffle 25 is located near, but below the mouths of the ducts 21 to 24, inclusive, and this baffle extends over an area equal to the area of the deck 16. The mouths of the ducts 21 to 24 inclusive are arranged partially to face one another to cause the streams issuing from each duct to converge into a single stream more or less coaxial and above the venturi and the baffle 25. If operations under cross wind conditions are anticipated, the stacks or ducts 21 to 24 inclusive may be arranged with the axes of their portions above the plane of baffle 25 in mutually convergent relationship but with the mouth of each duct in a horizontal plane.

Because heated saturated air tends to rise, if the moisture separating chamber 17 were not enclosed at its top by deck 16, the warm air would be drawn back into the inlet 12 of the venturi 11 causing recirculation and resulting loss of cooling capacity. Consequently, the vertical ducts 21 to 24 inclusive form an important part of this invention. They function to lead the warm air upwardly to discharge to atmosphere above the horizontal plane of baffle 25 and in this way prevent recirculation of air since the venturi 11 takes in its air below the plane of the baffle 25 and between the ducts 21–24. The air issuing from the ducts 21 to 24 inclusive, leaves at a high velocity and also being warm relative to the ambient, continues to rise so that there is no tendency to recirculation at all. Furthermore, the stack effect produced by causing the air streams issuing from the ducts 21 to 24 to converge further contributes to the prevention of recirculation of the air which has already been nearly saturated with warm evaporated water. The arrows in FIG. 1 show how the cool air flows to the bell mouth 12 underneath the baffle 25 while the hot air rises in a stack above the baffle 25.

Figure 3:
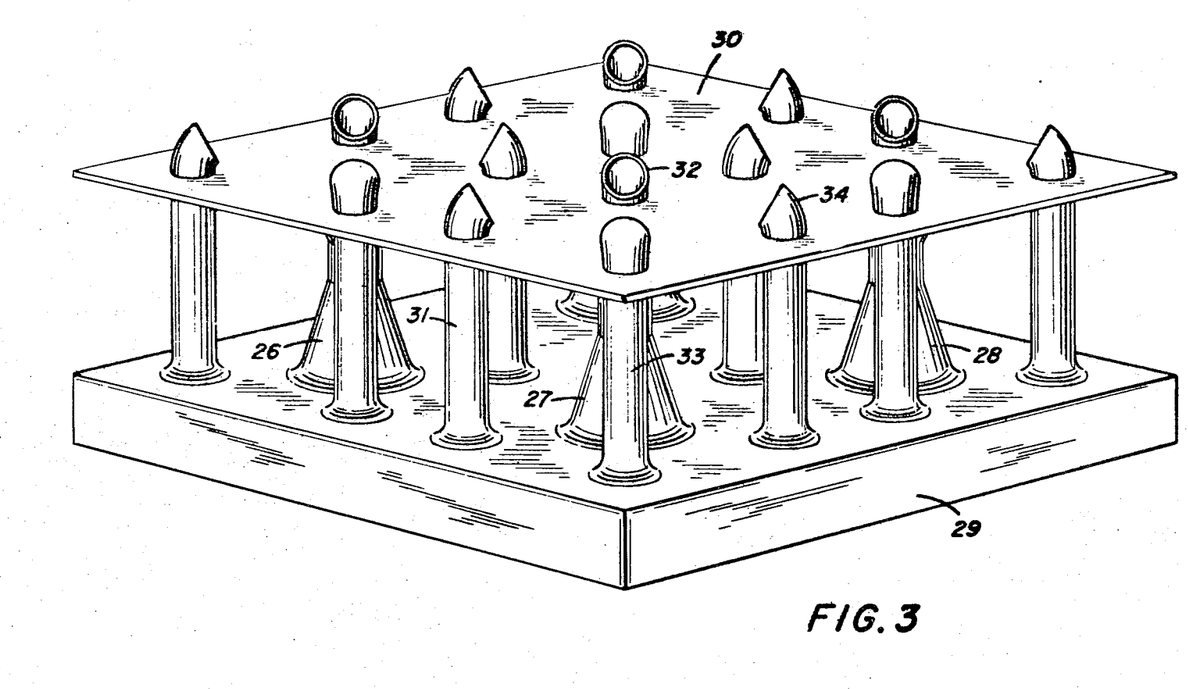
FIG. 3 is a schematic perspective view of a modified cooling tower comprised of four venturies of the type shown in FIG. 1 incorporated in a single pan and moisture separating chamber assembly.

While in FIGS. 1 and 2 there is shown a form of the apparatus involving but a single venturi, it is quite possible to arrange a number of venturies in an assembly with a common sump and moisture separating chamber and a common exhaust-intake separating baffle. In FIG. 3 there is shown an arrangement involving four venturies, three of which bearing numerals 26, 27, and 28, show in the drawings. These venturies are individually like the venturi 11 shown in FIG. 1 except that they have a common sump-moisture separating chamber 29 and a common air exhaust-air intake separation baffle 30. Each of the venturies is surrounded with four air ducts such as the ducts 31, 32, 33, and 34 which surround the venturi 27. By this type of arrangement, the cooling capacity of the unit can be greatly increased with the use of sump and baffle parts common to several venturies.

Figure 4:
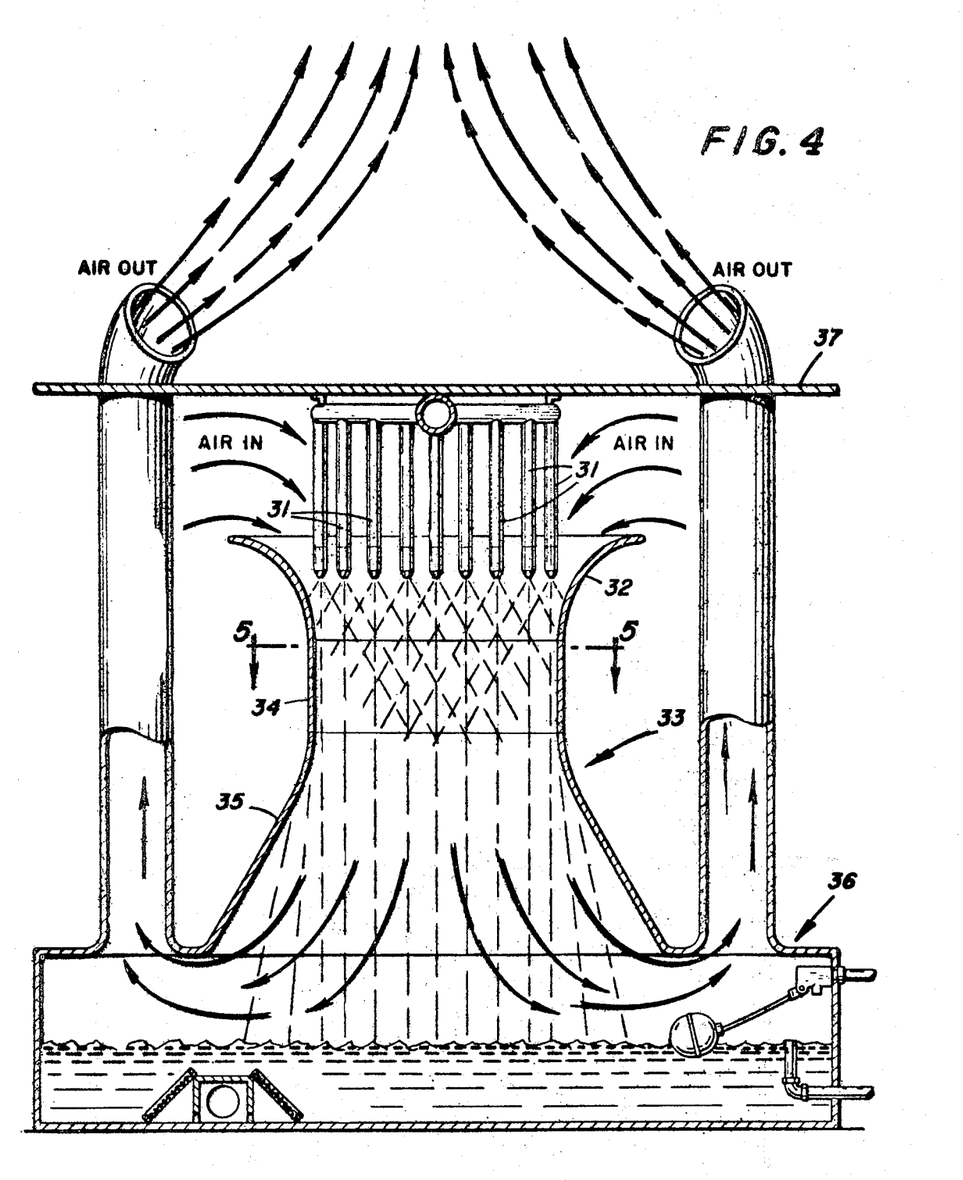
FIG. 4 is a view in vertical section of a modification of the present invention in which the venturi is provided with multiple spray heads.

In FIG. 1 the movement of the air is effected by a water jet issuing from single nozzle 10 mounted on supply conduit 46. In FIG. 4 there is shown an arrangement of many nozzles 31 which discharge over the cross-sectional area of a bell mouth 32 of a venturi 33 having a straight, narrow throat portion 34 and a diverging diffusion chamber 35. The construction of FIG. 4 includes a sump and a moisture separating chamber 36 similar in structure and function to the part 17 of FIG. 1 and a baffle 37 similar in structure and function to the baffle 25 of FIG. 1. Recirculation of air is prevented as before by the use of air conduits extending from the deck of the sump chamber 36 to a discharge mouth above the plane of baffle 37. As before, the mouths of these ducts are arranged to cause the air issuing therefrom to move in the direction of other air streams to merge and to form a stack generally axially above the venturi.

Figure 5:
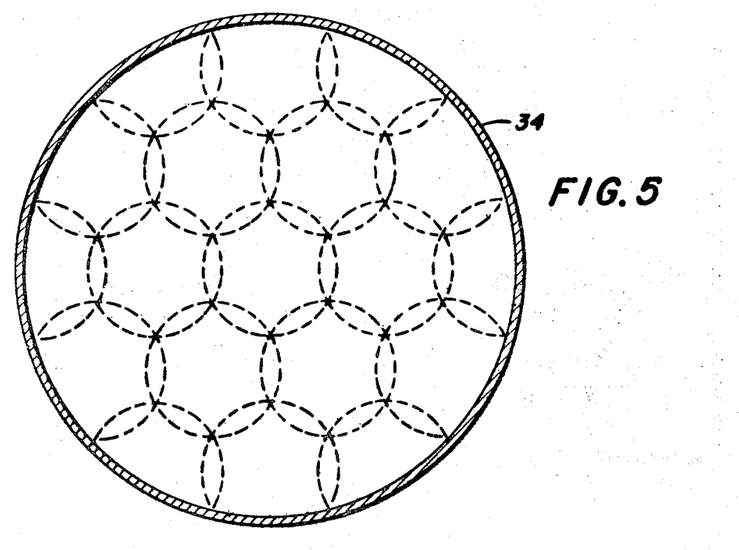
FIG. 5 is a view in horizontal section taken on the line 5—5 of FIG. 4.

In FIG. 5 the distribution of the multiple nozzles is shown and it can be seen that the spray from these various nozzles is such as to cover the cross section of the venturi with resulting inducement of air flow.

An important part of the present invention is that the water which is pumping the air moves at velocities much greater than the air with the result that there is considerable relative movement between the air and water with resulting good mixing. This mixing causes evaporation of some of the water and the heat of vaporization is taken from the remaining water which falls into the sump region in a cooled condition.

Figure 6:
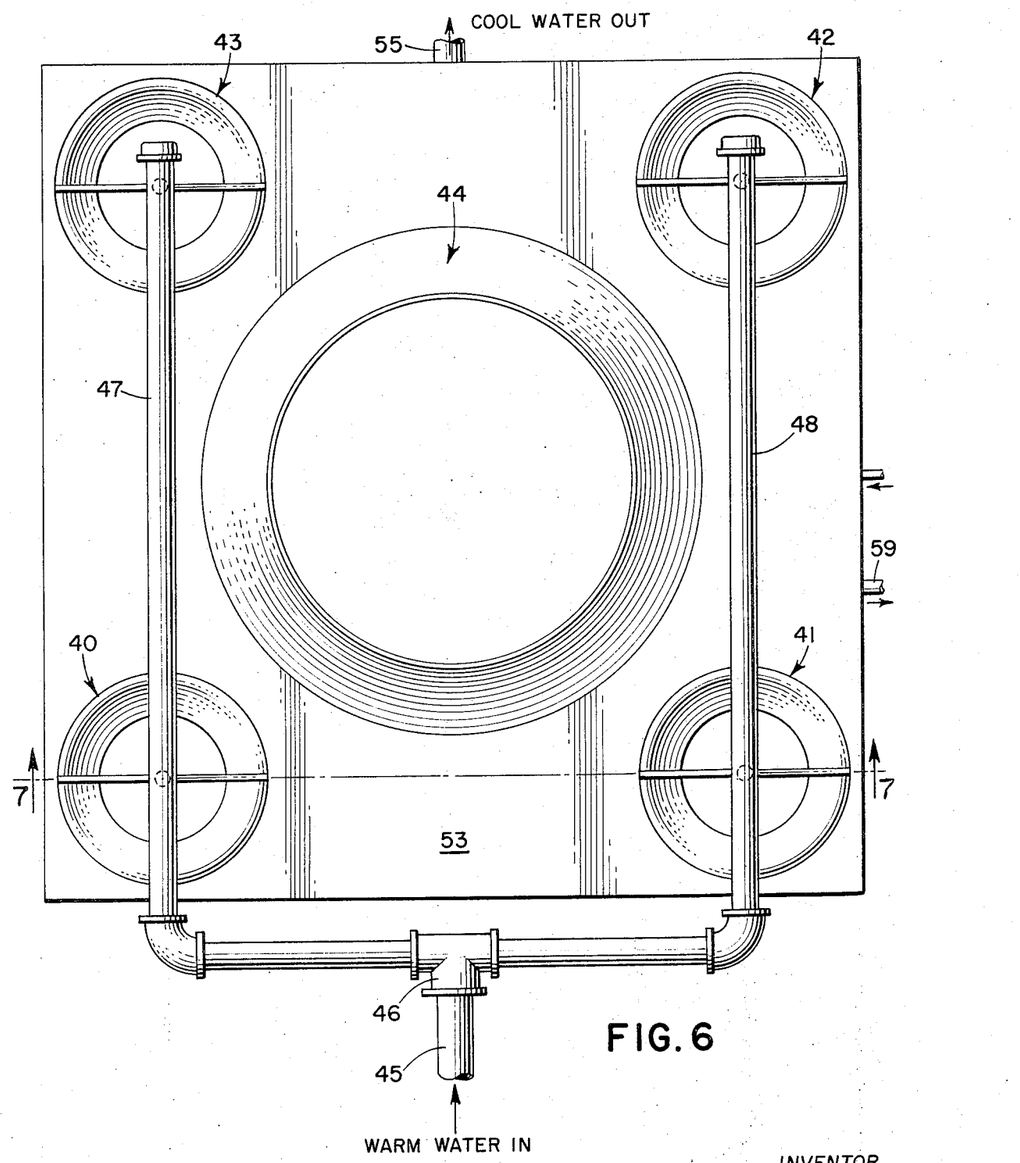
FIG. 6 is a top plan view of a modification of the present invention designed to have large cooling capacity with low overall height for an injector type cooling tower.
Figure 7:
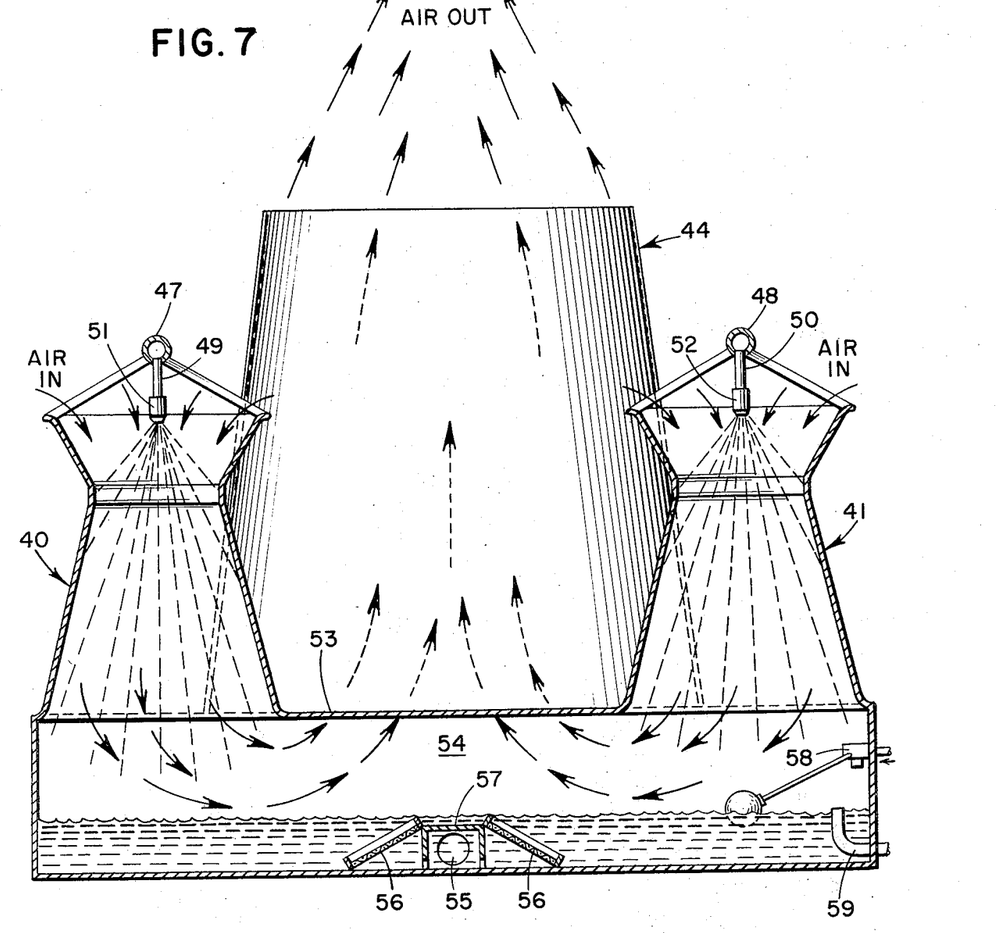
FIG. 7 is a view in vertical section taken on the line 7—7 of FIG. 6.

While the baffle 25 of the construction of FIGS. 1 and 2 had been found effective to prevent recirculation and while this is also true of the baffles 30 of the FIG. 3 construction and the baffle 37 of the FIG. 4 construction, by arranging a plurality of injectors around a central stack, it is possible not only to reduce the overall height requirements of the equipment but to prevent recirculation without the use of a baffle. An example of a construction having these capabilities is depicted in FIGS. 6 and 7 of the drawings. In this construction there are four ventures 40, 41, 42, and 43. These four ventures are of identical size and shape and are disposed symmetrically about 90° apart from a large central stack 44. The nozzles of the ventures are served by a water supply system consisting of an inlet conduit 45 which through a "T" connection 46 serves branch pipes 47 and 48. Branch pipe 47 has connected to it nozzle feed lines for the nozzles which serve ventures 40 and 43 and pipe 48 has connected to it the nozzle feed lines which serve ventures 41 and 42. In FIG. 7 two of these nozzle feed lines bearing numerals 49 and 50 serving ventures 40 and 41 respectively can be seen. Each venturi is provided with a spray nozzle such as the nozzles 51 and 52 which serve the ventures 40 and 41, see FIG. 7. The ventures 40 to 42 inclusive are supported from a common deck 53 which forms the top of the enclosed pan section 54. The central stack 44 also is supported from the deck 53. Below the deck and within the pan section 54 there are located the cool water withdrawal system 55 comprised of the usual strainers 56 and anti-vortex baffle 57 as well as float-actuated make-up valve system 58 and overflow 59. In operation of the form of the invention shown in FIGS. 6 and 7, the water is caused to spray from the nozzles of each venturi. These ventures suck in air from the top of the unit and cause the air to flow into the pan section 54. In doing so there is large air-water interface and water is evaporated taking its heat of vaporzation from the remaining water which is delivered to the sump at the bottom of the pan section in a cooled condition from which it is withdrawn from system 55 to be used. The air leaving the injectors or ventures turns as indicated by the arrows in FIG. 7 and flows up the stack. Note that the stack 44 is arranged with its top in somewhat frustoconical shape. This has been found to promote an excellent stack draft which is very effective in preventing air issuing from the system from recirculating to reenter the tops of the ventures. Thus, a baffle such as is shown in FIG. 1 may not be necessary in a construction such as is shown in FIGS. 6 and 7. The construction of FIGS. 6 and 7 has great advantage where high cooling capacity is required but overall height requirements are severe. Capacity in final analysis is related to how much air and water can be contacted per unit time and this gets to be a matter of venturi throat cross-section. The geometry of a venturi, being what it is, enlargement of the throat cross section necessarily results in proportional increases in height in order that the convergence and divergence angles and areas be maintained in proper proportions. Thus a venturi with a 2' diameter throat 7' high would have to be made 14' high if the throat diameter were increased to 4'. By the arrangement of FIGS. 6 and 7, increases in height are prevented by using a plurality of injectors so that the height of each injector is controlled by the cross-sectional area of its throat while the capacity of the unit is proportional to the sum of the cross-sectional area of the throats of all the ventures. For example, if the construction of FIGS. 6 and 7 is made with the area of the sump region 54 equal to the area of sump region 17 of FIG. 1 for an equal heat dissipation capacity, the total throat area of the four ventures 40 to 43 inclusive must equal the throat area 13 of the venturi 11. Yet the height of the unit of FIG. 7 under these supposed circumstances will be about ½ that of the FIG. 1 construction. Since the cross sectional area of the venturi throat is a function of diameter, it follows that when the area is reduced to ¼, the diameter is halved and, to keep proportions, this results in a ½ reduction in height.

Figure 8:
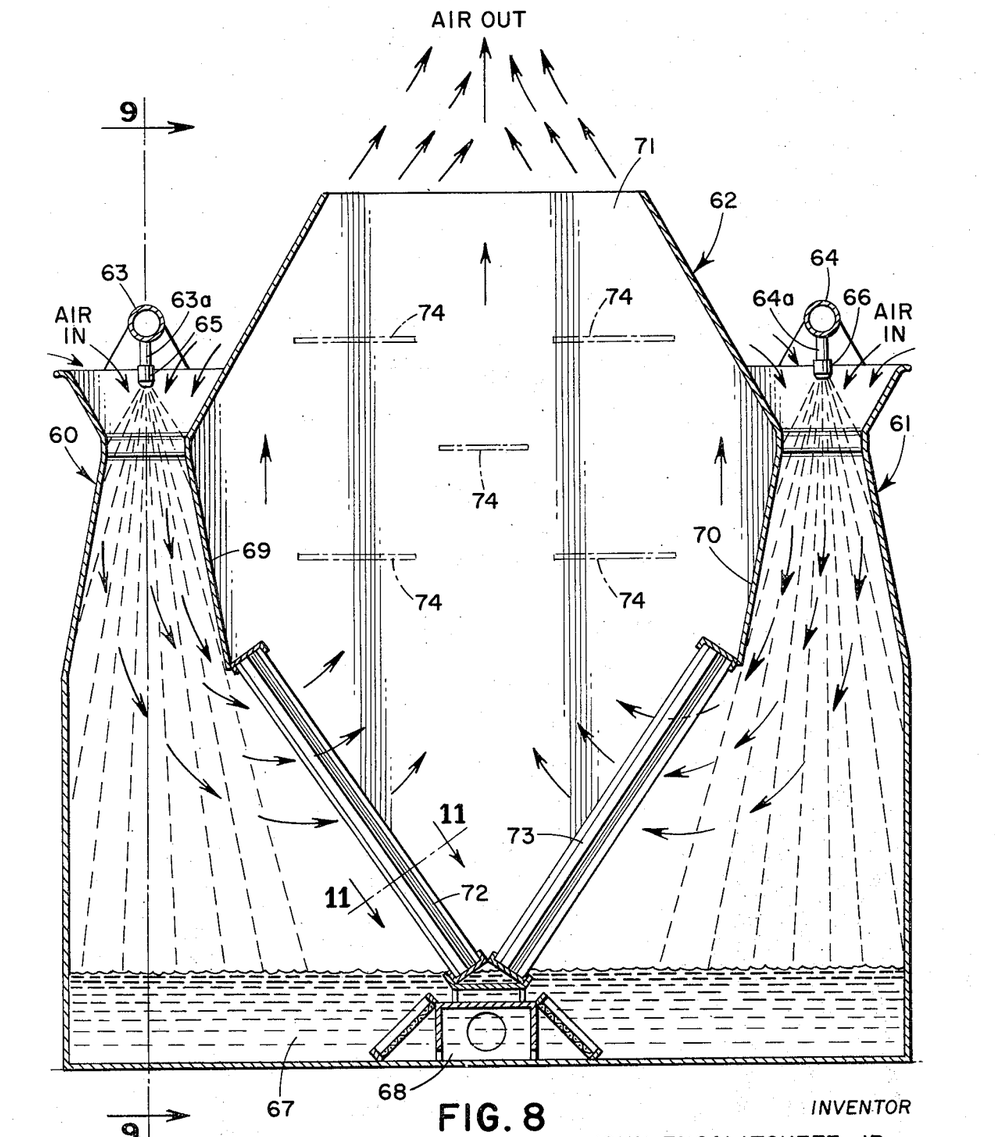
FIG. 8 is a view in vertical section of an injection type cooling tower having injectors with throats in the form of elongated slots, the inner wall of the injectors partially defining a common exhaust stack.
Figure 9:
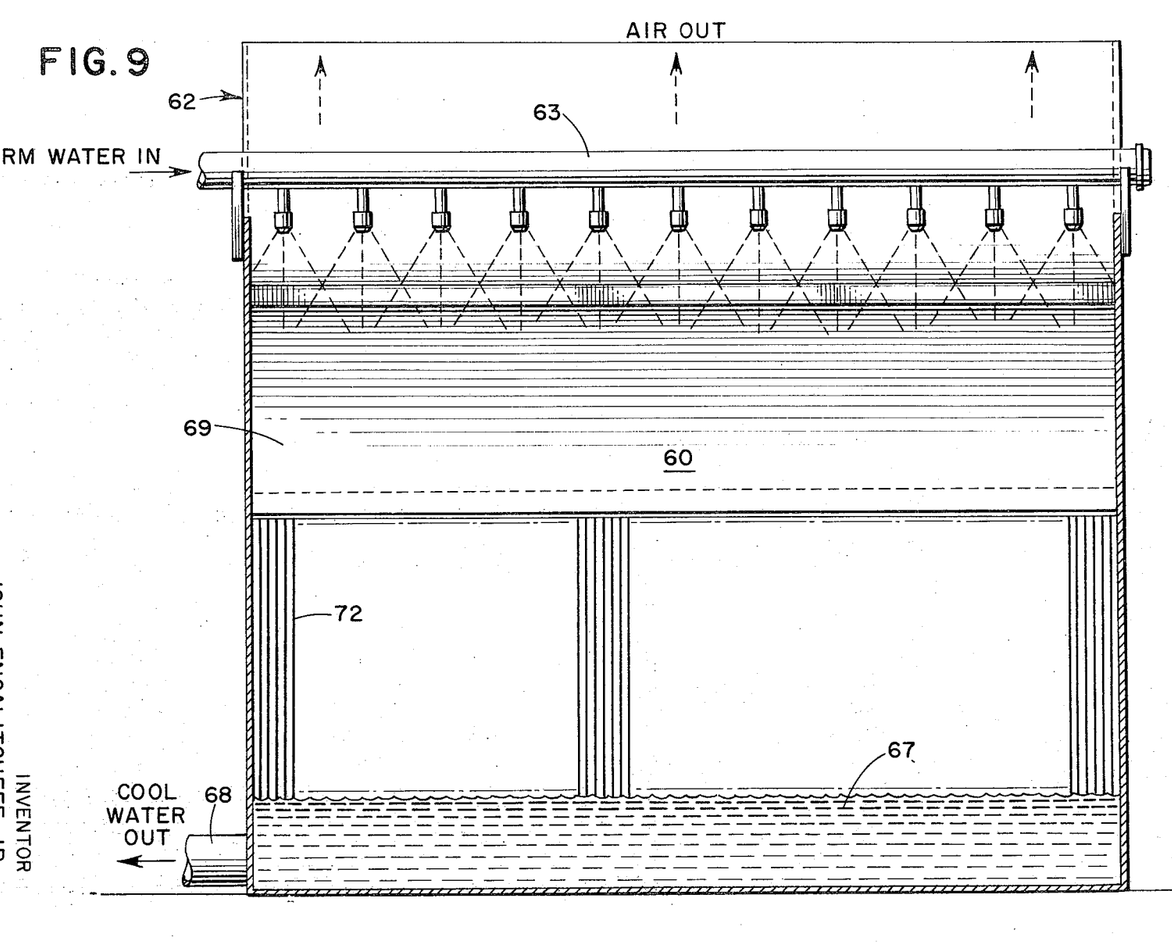
FIG. 9 is a view in section taken on the line 9—9 of FIG. 8.
Figure 10:
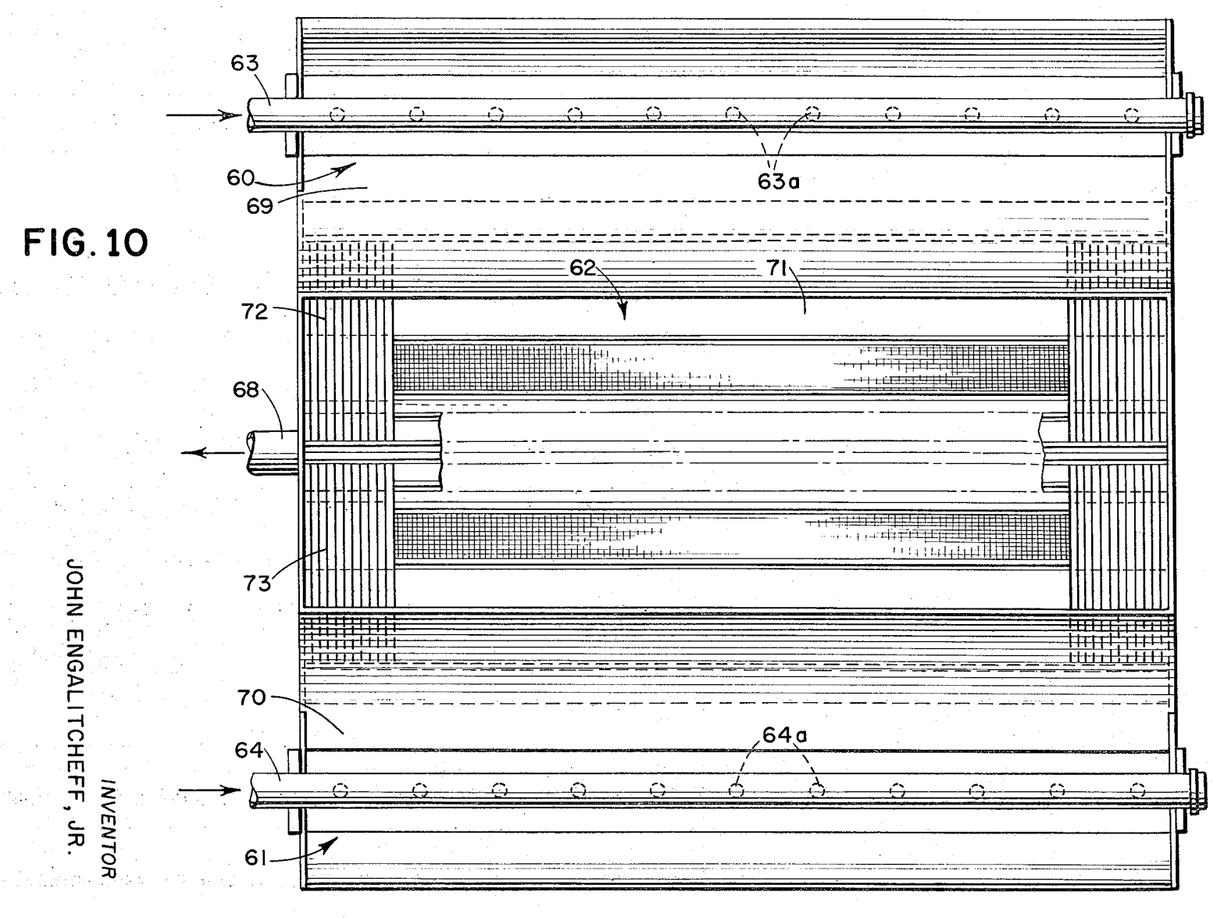
FIG. 10 is a top plan view of the modification shown in FIG. 8.
Figure 11:
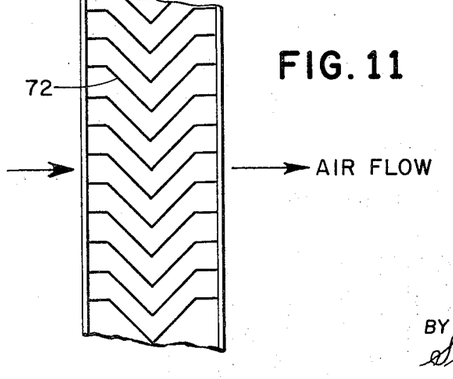
FIG. 11 is a fragmentary view in section taken on line 11—11 of FIG. 8 and illustrating the mist eliminators incorporated in that piece of equipment.

The general concept of FIGS. 6 and 7 is subject to incorporation in quite sophisticated designs. For example, in FIG. 8 there is shown a unit having two ventures 60 and 61 located on opposite sides of a central stack 62. Ventures 60 and 61 are not circular in cross section, however, but are elongated so that the cross section of the throat of each venturi is a long narrow rectangle. See in this regard FIG. 10. The venturi 60 is served by a water pipe 63 and the venturi 61 is served by a water pipe 64. These pipes run the length of the unit and there are a number of dependent nozzle supply pipes 63a extending from pipe 63 and 64a extending from pipe 64. There is a nozzle at the lower end of each pipe 63a or 64a. The row of nozzles serving venturi 60 is shown in FIG. 9 and these nozzles bear reference numeral 65. The nozzles of the row which serve venturi 61 bear reference numeral 66. The construction of the unit of FIGS. 8, 9, 10 and 11 is one designed to save material and to produce a unit not only having small height requirements but also small floor area requirements. To this end, the outer walls of ventures 60 and 61 are continued downwardly below the discharge end of the venturi to define a sump region 67. The sump region 67 has the usual discharge facilities 68 and will, of course, contain makeup and overflow facilities not shown.

The inner walls 69 and 70 respectively of ventures 60 and 61 partially define the side walls of the stack 62. Above the top of the venturi the walls 69 and 70 extend to the mouth 71 of the stack 62. The lower portion of each venturi, of course, functions as a diffuser. The height above the water determines the velocity of the air as it turns to enter the stack. If in order to reduce height the distance above the water in the sump is reduced to a minimum causing the turning velocity to be high, it is necessary to use mist eliminators to prevent entrainment of water into the air exhaust region. In FIG. 8 there are shown two banks of mist eliminators 72 and 73 which run for the full length of the unit. The shape of these eliminators can be seen by reference to FIG. 11. In broken lines there are shown baffles 74 arranged in the stack and these may be used instead of the mist eliminators 72 and 73. Baffles arranged such as baffles 74 will force the air into many sharp turns and cause the water droplets to be disentrained and to fall back into the sump. Note that the water level in the sump seals the bottom of eliminators 72 and 73. The warm saturated air and the tapering of the stack both tend to prevent recirculation and in fact high velocity air leaving a stack such as is shown in FIG. 7 and FIG. 8 actually has the effect of drawing fresh air adjacent to the upper or inlet mouths of the venturies.

Figure 12:
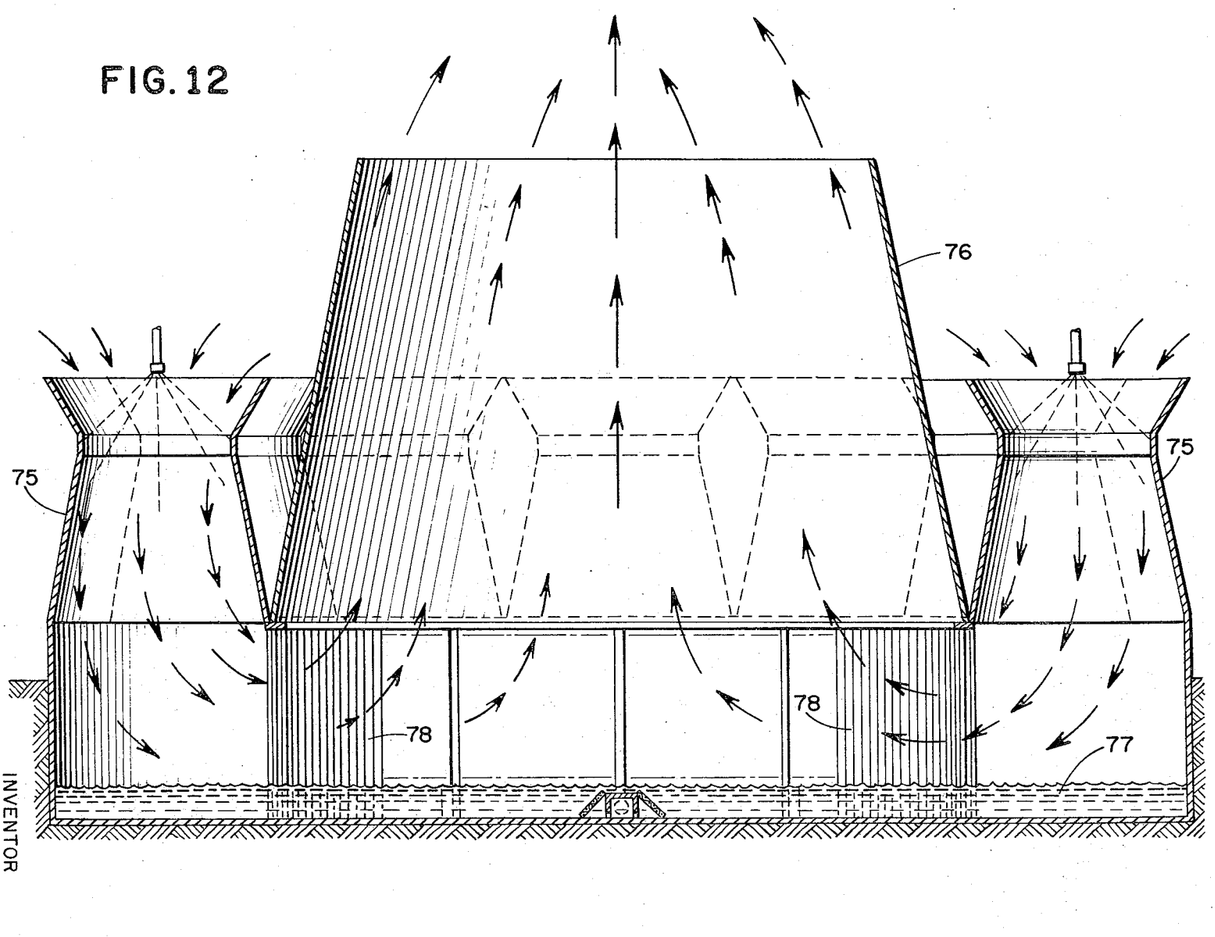
FIG. 12 is a view in elevation of a very large high-capacity type cooling tower constructed in accordance with the principles of the present invention.
Figures 13A, 13B, 13C:
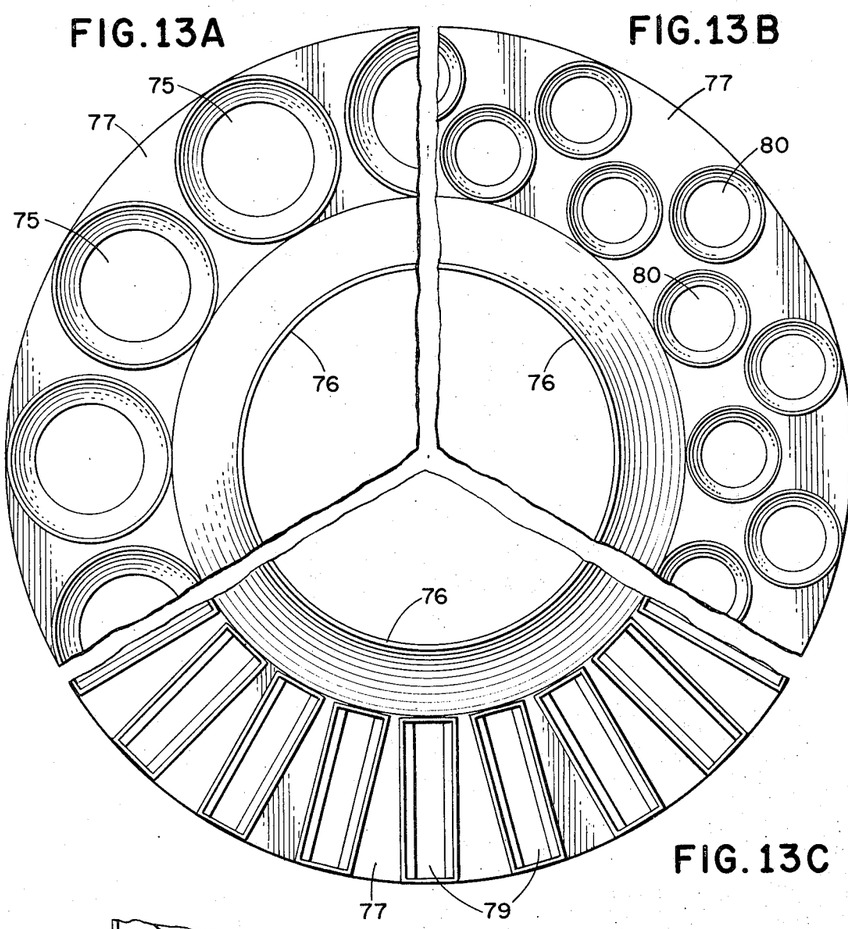
FIG. 13A is a fragmentary view in plan of a large capacity tower of the type of FIG. 12.
FIG. 13B is a view in plan showing an arrangement of concentric rows of injectors each serving a common stack.
FIG. 13C is an arrangement showing a large number of injectors of the slotted type arranged to serve a common stack in a large, very high capacity unit.

In FIG. 12 there is shown a cooling tower constructed in accordance with the teachings of the present invention which is similar in theory to the arrangement of FIG. 7 but extremely large and intended to handle very large volumes of water per unit time. A plurality of venturies 75 are arranged around a central tapered stack 76. A common sump 77 is provided and mist eliminators 78 are arranged in an angular path around the bottom of the stack 76 to prevent entrainment of the water from the various injectors. In this type of construction the injectors may be circular as shown in FIG. 12 and in FIG. 13A or the injectors may be slotted as shown at 79 in FIG. 13C or a plurality of injectors may be arranged in concentric paths as shown in FIG. 13B. In any case, a large number of these injectors will serve a common centrally-located tapered stack and the principle of the present invention of proportioning the cross-section of a common stack to the sum of the throat cross sections of the serving venturies will be utilized.

Figure 14:
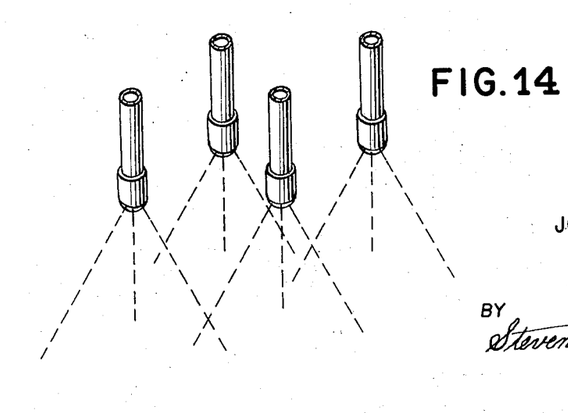
FIG. 14 is a fragmentary view showing a nozzle cluster advantageous to produce good air-water mixing and to prevent clogging when used with any of the foregoing modifications of the invention.

In FIG. 14 there is shown a nozzle cluster arrangement. These nozzles are arranged to spray out water in such a way that the spray from one nozzle interferes and impinges upon the spray of another. The effect of this is to break up the water and to create a large air-water interface. The multiple nozzles or cones produce a spray more readily penetrable by the air than a continuous sheet of water as produced from a single cone. This further improves air-water mixing. It has been found that this is much better than trying to use a larger single fine spray nozzle since fine spray nozzles have a tendency to clog. The overlap and intimate mixing and turbulance causes increase in the heat transfer and offsets the effect of coarser atomization.

The invention may be embodied in other specific forms without departing from the spirit or essential characteristics hereof. The embodiment and the modification described are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Venturi as used in the specification and claims of this application is intended to cover an injector with a throat of reduced area regardless of the shape of the cross section of any of the throat or the inlet to it or outlet from it.

FIGS. 8-13 of this application and the corresponding descriptive material are exemplifications of the broad principles of the present invention as set forth in the appended claims but contain subject matter which is the invention of others and is embodied in an application filed Oct. 27, 1969, and assigned Ser. No. 869,798.

What I claim is:

1. An evaporative heat exchanger comprising a vertical venturi having an air intake at its upper end exposed to the ambient, means to inject water downwardly within the venturi in the form of a spray of sufficient divergence to contact the inner walls of the venturi, enclosed means to receive the air and water issuing from the lower end of the venturi, and ducts spaced around the venturi discharging to atmosphere above the venturi air intake and having converging axes to produce a stack effect in the discharged air further to prevent recirculation.

2. An evaporative heat exchanger comprising a plurality of venturies each having an intake at one end exposed to the ambient and means to inject water within the venturi in the form of a spray of sufficient divergence to contact the inner walls of the venturi, common means to receive the air and water issuing from the other end of said venturies and common stack means for conducting air from said enclosed means to a region of discharge remote from the air intake of said venturies, the periphery at the air intake of each venturi being laterally spaced from the periphery of the stack at its mouth, there being at least two venturies lying on opposite sides of said common means for conducting air.

3. An evaporative heat exchanger comprising a plurality of venturies each having an intake at one end exposed to the ambient and means to inject water within the venturi in the form of a spray of sufficient divergence to contact the inner walls of the venturi, common means to receive the air and water issuing from the other end of said venturies and common stack means for conducting air from said enclosed means to a region of discharge remote from the air intake of said venturies, the periphery at the air intake of each venturi being laterally spaced from the periphery of the stack at its mouth, the number of said venturies being in excess of two and being arranged in a path surrounding said common means for conducting air.

4. An evaporative heat exchanger comprising a plurality of venturies each having an intake at one end exposed to the ambient and means to inject water within the venturi in the form of a spray of sufficient divergence to contact the inner walls of the venturi, common means to receive the air and water issuing from the other end of said venturies and common stack means for conducting air from said enclosed means to a region of discharge remote from the air intake of said venturies, the periphery at the air intake of each venturi being laterally spaced from the periphery of the stack at its mouth, the plurality of venturies being arranged around the common stack means in several rows.

* * * * *